United States Patent Office 3,277,161

Patented Oct. 4, 1966

1

3,277,161

PRODUCTION OF CYCLOHEXYLAMMONIUM-N-CYCLOHEXYLSULFAMATE FREE OF CYCLOHEXYLAMINE SULFATE

Rudolph G. Sundberg, Waukegan, Wayne E. Trussell, Chicago, and Robert R. Smutney, Green Oaks, Ill., assignors to Abbott Laboratories, Chicago, Ill., a corporation of Illinois No Drawing. Filed May 2, 1963, Ser. No. 277,458

2 Claims. (Cl. 260—501)

This invention relates to the manufacture of cyclohexylsulfamic acid. More particularly, it relates to the manufacture of salts of cyclohexylsulfamate substantially free of cyclohexylamine sulfate.

In the past, various processes have been used and exploited for the manufacture of cyclohexylsulfamic acid and its salts. In most of these processes, cyclohexylamine is used as the starting material and is reacted with a sulfonating agent. Among the sulfonating agents commonly used are sulfamic acid, chlorosulfonic acid, sulfur trioxide, and the like. Unfortunately, the reaction between sulfuric acid or its derivatives on the one hand, and cyclohexylamine on the other hand, produces a number of undesirable by-products, aside from the desired cyclohexylammonium-N-cyclohexylsulfamate (hereinafter simply referred to as "double-salt"). The latter, by simple hydrolysis, produces cyclohexylsulfamic acid or its salts. In spite of obtaining the "double-salt" in very good yields, it still has to be purified and the various by-products have to be eliminated. Depending on the coreactant of cyclohexylamine, one by-product may occur in larger amounts than the others.

The most economical reactants for producing the above "double-salt" would be cyclohexylamine and sulfur trioxide. However, the reaction product obtained thereby is contaminated with larger amounts of cyclohexylamine sulfate than when other coreactants, e.g. sulfamic acid, are used for making "double-salt." Unfortunately, cyclohexylamine sulfate has physical characteristics similar to those of the "double-salt" which make the separation of the two very cumbersome, expensive and impractical. While small amounts of cyclohexylamine sulfate can be tolerated in the "double-salt"/cyclohexylamine sulfate mixture, amounts larger than about 2.1% are not economically acceptable because of the difficulty and expense involved for their removal. The alkaline hydrolysis which converts the "double-salt" into cyclohexylamine and an alkaline salt of cyclohexylsulfamic acid also hydrolyzes the cyclohexylamine sulfate, producing cyclohexylamine and the corresponding sulfate salt. The latter is equally difficult to remove from the cyclohexylsulfamate as is cyclohexylamine sulfate from the "double-salt." Thus, the cyclohexylamine sulfate produced as a by-product in the preparation of the "double-salt" creates additional contamination in the usual process for making cyclamate salts.

It is therefore an object of the present invention to produce "double-salt" substantially free of cyclohexylamine sulfate. It is a particular object of the present invention to provide a new and improved process for the production of "double-salt" free of cyclohexylamine sulfate when cyclohexylamine and sulfur trioxide are used as the coreactants, since this otherwise very economical process is apt to produce somewhat larger amounts of the cyclohexylamine sulfate as a by-product. It is a further object of the present invention to provide a method for the substantially complete removal of cyclohexylamine sulfate from a solution of "double-salt" in cyclohexylamine. Other objects will be apparent from the following disclosure.

The objects of the present invention are accomplished

2 by providing a filtration step carried out within a specified and predeterminable temperature range. With such a step, it has been found, cyclohexylamine sulfate is substantially eliminated from a liquid mixture comprising said "double-salt" and said cyclohexylamine sulfate in cyclohexylamine. The temperature required for this filtration lies between the boiling point of the cyclohexylamine solution and a lower temperature limit calculated from the formula $$t=62.0+90.1Z-75.3Z^2+40.9Z^3$$

wherein $Z=\log_{10} X$ in which X stands for the concentration of "double-salt" in grams per hundred grams of cyclohexylamine.

The upper limit of this temperature range at atmospheric pressure lies at about 134° C., depending on the amount of "double-salt" dissolved in the system; however, if the system is kept under super-atmospheric pressure it obviously may be considerably higher. The lower temperature limit for this filtration step is easily calculated from the above formula. For a general and practical guide this temperature usually lies in the neighborhood of between 110° and 135° C. Of course, excellent results may always be achieved by filtering at or very near to the boiling point of the fluid mixture.

In a simple embodiment of the present invention, a reaction mixture from cyclohexylamine and sulfur trioxide, containing a large excess of cyclohexylamine, "double-salt," cyclohexylamine sulfate, and other sulfonated by-products, is filtered at a temperature which is selected to lie within the above limits. The concentration of "double-salt" per hundred grams of cyclohexylamine is determined and expressed in grams of "double-salt" per hundred grams of cyclohexylamine. This is the only parameter necessary for the above determination of the lowest filtration temperature which will produce substantial removal of cyclohexylamine sulfate. For instance, at a concentration of 10 grams of "double-salt" per 100 grams of cyclohexylamine, the above equation will result in a calculated lower temperature limit of 117.7° C., and at atmospheric pressure the upper temperature limit would be about 134° C. The reaction mixture is thus heated to a temperature between 117.7° and 134° C. and filtered within this temperature range, to produce a filtrate substantially free of cyclohexylamine sulfate. If the amount of cyclohexylamine used in this reaction were twice as high as the one exemplified above, the lower temperature limit calculated from the above formula would be at 102.2° C. and thus filtration within a temperature range of between 102° and 134° C. will produce a filtrate substantially free of cyclohexylamine sulfate.

To better illustrate the process of the present invention, reference is made to the following examples. However, it is to be kept in mind that these examples are illustrations only and are not meant to limit the invention in any respect.

*Example 1*

A slurry containing 7.9 grams of "double-salt" and 0.70 gram of cyclohexylamine sulfate per 100 grams of cyclohexylamine is heated to 115° C. and filtered at or above this temperature (minimum temperature calculated: 112° C.). The filter-cake is washed with fresh, hot cyclohexylamine to remove any "double-salt" therefrom. The filtrate and the wash liquor are combined and cooled to 30° C. to crystallize the "double-salt." Analysis of the filter-cake shows it to contain 0.65 gram of cyclohexylamine sulfate and no "double-salt." From the cooled filtrate, substantially pure "double-salt" is removed by filtration and the mother liquor obtained therefrom contains 1.65 grams of "double-salt" and 0.05 gram of cyclohexylamine sulfate. Combining the dry solids obtained by evaporation of this filtrate with the first crop of pure "double-salt" shows an over-all "double-salt" purity of 99.4%. Using this technique, 92.9% of the cyclohexylamine sulfate initially present is removed.

If the above slurry is evaporated to dryness without hot filtration, the resulting product contains the "double-salt" in a purity of only 90.7%. While the non-filtered product cannot be used for the manufacture of good quality cyclamate salt by hydrolysis, the filtered product passes all specifications.

*Example 2*

A slurry of 4.6 grams of "double-salt" and 0.5 gram of cyclohexylamine sulfate per 100 grams of cyclohexylamine is filtered at 115° C. (minimum temperature calculated: 100.6° C.) and the filter-cake is washed with 10 cc. of cyclohexylamine at 115° C. Upon evaporation of the filtrate, "double-salt" is obtained in a purity of 99.4%. The removal of cyclohexylamine sulfate by this filtration amounts to 94.0% of the amount initially present.

When, in the above example, the initial slurry is filtered at 50° C., the "double-salt" obtained after evaporation of the filtrate has a purity of only 92.9% and only 76.7% of the initially present cyclohexylamine sulfate is removed.

*Example 3*

A slurry of 5.96 grams of "double-salt" and 0.54 gram of cyclohexylamine sulfate per 100 grams of cyclohexylamine is filtered at 115° C. (minimum temperature calculated: 81.5° C.) and washed with 12 cc. of cyclohexylamine at 115° C. After evaporation of the combined filtrate and wash liquor, the "double-salt" is obtained in a purity of 99.5%, and 92.7% of the initially present cyclohexylamine sulfate is removed therefrom.

When in the same example a filtration temperature of 50° is used, the obtained "double-salt" has a purity of only 92.9% and only 78.0% of the initially present cyclohexylamine sulfate is removed.

*Example 4*

A slurry of 12.95 grams of "double-salt" and 1.45 grams of cyclohexylamine sulfate in 100 grams of cyclohexylamine is filtered at 126° C. (minimum temperature calculated: 125.6° C.) and washed with 10 cc. of fresh cyclohexylamine at 126° C. Upon evaporation of the combined filtrate and wash liquor, "double-salt" is obtained in a purity of 100% with 99.9+% of the cyclohexylamine sulfate being removed therefrom.

When in the same example a filtration temperature of 55° C. is used, the purity of the "double-salt" is only 94.0%, with 89.8% of the initially present cyclohexylamine sulfate being removed.

*Example 5*

A slurry of 3.86 grams of "double-salt" and 2.27 grams of cyclohexylamine sulfate per 100 grams of cyclohexylamine is filtered at 81° C. (minimum temperature calculated: 81.5 C.) and washed with 12 cc. of cyclohexylamine at 95° C. The combined filtrate and wash liquor is evaporated, producing a "double-salt" of 100% purity from which 99.9+% of the initially present cyclohexylamine sulfate is removed.

When the above solution is filtered at 40° C., the obtained dry "double-salt" has a purity of only 87.0% from which 62.9% of the initially present cyclohexylamine sulfate is removed.

When the above solution is filtered at 80° C. the obtained "double-salt" has a purity of only 95.7% from which 78.0% of the initially present cyclohexylamine sulfate is removed.

From the foregoing examples it will be seen that the filtration carried out at a temperature within the range calculated according to the present invention produces an excellent quality "double-salt" from which hydrolysis produces high quality cyclamate salt. It is also demonstrated that the difficultly removable cyclohexylamine sulfate is removed almost quantitatively. It is particularly interesting to note that using filtration temperatures only slightly above the calculated minimum temperature permissible according to the above equation produces excellent results while, as shown in Example 5, temperatures only slightly below said minimum temperature produce a vastly inferior product.

The present invention is of great importance in the manufacture of salts of cyclohexylsulfamic acid which are made by hydrolyzing the "double-salt." Such hydrolysis carried out, for instance, with sodium hydroxide will produce sodium cyclamate of excellent purity, ready for use as an artificial sweetener with very little work-up. The present process is of particular value when the newer method of making "double-salt" starting with $SO_3$ and cyclohexylamine is used. This latter method is more economical than other and older methods but produces somewhat more cyclohexylamine sulfate as by-product which, unless removed by the process of the present invention, stands in the way of using the aforesaid starting materials on a commercial scale operation. While smaller amounts of cyclohexylamine sulfate can be removed by other methods, only the present, simple process provides for reproducible and consistently good results.

Others may practice the invention in any of the numerous ways which will be suggested to one skilled in the art by the present disclosure. All such practice of the invention is considered to be a part hereof, provided it falls within the scope of the appended claims.

We claim:

1. The process of removing cyclohexylamine sulfate from a fluid mixture of cyclohexylammonium-N-cyclohexylsulfamate and cyclohexylamine sulfate in cyclohexylamine, comprising filtering said mixture at a temperature of between $t$ and the boiling point of said fluid mixture, whereby $t$ is calculated according to the formula $$t=62.0+90.1Z-75.3Z^2+40.9Z^3$$

wherein Z is $\log_{10}$ X and X stands for the number of parts by weight of cyclohexylammonium-N-cyclohexylsulfamate per 100 parts by weight of cyclohexylamine.

2. The process according to claim 1 wherein said fluid mixture is filtered at a temperature close to the boiling point of said mixture.

References Cited by the Examiner

UNITED STATES PATENTS 2,826,605 3/1958 Thompson -------- 260—600 X

LORRAINE A. WEINBERGER, *Primary Examiner.*

LEON ZITVER, *Examiner.*

B. M. EISEN, M. WEBSTER, *Assistant Examiners.*